(12) United States Patent
Zhang et al.

(10) Patent No.: US 7,496,214 B2
(45) Date of Patent: *Feb. 24, 2009

(54) METHOD OF PALM PRINT IDENTIFICATION

(75) Inventors: Dapeng David Zhang, Kowloon (HK); Jia Jane You, Kowloon (HK); Wai Kin Adams Kong, Kowloon (HK); Guangming Lu, Kowloon (HK); Xiangqian Wu, Kowloon (HK)

(73) Assignee: The Hong Kong Polytechnic University, Hong Kong (HK)

( * ) Notice: Subject to any disclaimer, the term of this patent is extended or adjusted under 35 U.S.C. 154(b) by 539 days.

This patent is subject to a terminal disclaimer.

(21) Appl. No.: 10/865,604

(22) Filed: Jun. 10, 2004

(65) Prior Publication Data

US 2004/0264742 A1    Dec. 30, 2004

Related U.S. Application Data

(63) Continuation-in-part of application No. 10/253,914, filed on Sep. 25, 2002.

(51) Int. Cl.
    *G06K 9/00* (2006.01)
(52) U.S. Cl. ............... 382/115; 340/5.53; 340/5.83
(58) Field of Classification Search ............. 382/115; 340/5.53, 5.83
    See application file for complete search history.

(56) References Cited

U.S. PATENT DOCUMENTS

| 4,032,889 A | 6/1977 | Nassimbene |
| 4,206,441 A | 6/1980 | Kondo |
| 4,357,597 A | 11/1982 | Butler |
| 4,720,869 A | 1/1988 | Wadia |
| 4,805,223 A | 2/1989 | Denyer |
| 5,528,355 A | 6/1996 | Maase et al. |
| 5,717,786 A | 2/1998 | Kamei |
| 5,719,950 A | 2/1998 | Osten et al. |
| 5,937,082 A | 8/1999 | Funada |
| 6,018,586 A | 1/2000 | Kamei |
| 6,038,332 A | 3/2000 | Fishbine et al. |
| 6,118,891 A | 9/2000 | Funada |
| 6,175,407 B1 | 1/2001 | Sartor |
| 6,370,263 B1 | 4/2002 | Hiratsuka et al. |

(Continued)

FOREIGN PATENT DOCUMENTS

CA    2379452    9/2002

(Continued)

OTHER PUBLICATIONS

Zhang, David. Automated Biometrics: Technologies and Systems, 2000, Kluwer Academic Publishers, Chapter 6, p. 111-135.*

(Continued)

*Primary Examiner*—John B Strege
(74) *Attorney, Agent, or Firm*—Jackson Walker, LLP

(57) ABSTRACT

A method of biometrics identification includes obtaining an image including a portion of a hand of an individual, analyzing the image to find one or more feature parameters defining different characteristics of the hand, and comparing the feature parameters with reference information in a database. The features parameters including a geometrical features parameter, a palm line features parameter or a palm texture features parameter.

8 Claims, 9 Drawing Sheets

U.S. PATENT DOCUMENTS

| | | |
|---|---|---|
| 6,539,101 B1 | 3/2003 | Black |
| 2002/0141620 A1 | 10/2002 | Monden |
| 2002/0164055 A1 | 11/2002 | Funada |
| 2002/0164056 A1 | 11/2002 | Funada |

FOREIGN PATENT DOCUMENTS

| | | |
|---|---|---|
| CN | 1302044 | 7/2001 |
| EP | 0930580 | 1/1999 |
| JP | 9167230 | 6/1997 |
| JP | 200048194 | 2/2000 |
| WO | WO 99/12123 | 3/1999 |
| WO | WO 02/103618 | 12/2002 |

OTHER PUBLICATIONS

W. Shu and D.Zhang, "Automated personal identification by palmprint," *Optical Engineering*, vol. 37, No. 8, pp. 2659-2362, 1998.

D. Zhang and W. Shu, "Two novel characteristics in palmprint verification: datum point invariance and line feature matching," *Pattern Recognition*, vol. 32, No. 4, pp. 691-702, 1999.

J. You, W. Li and D. Zhang, "Hierarchical palmprint identification via multiple feature extraction," *Pattern Recognition*, vol. 35, No. 4, pp. 847-859, 2002.

N. Duta, A.K. Jain, and K.V. Mardia, "Matching of palmprint," *Pattern Recognition Letters*, vol. 23, No. 4, pp. 477-485, 2001.

W. Shu, G. Rong, Z. Bain and D. Zhang, "Automatic palmprint verification," *International Journal of Image and Graphics*, vol. 1, No. 1, pp. 135-152, 2001.

C.C. Han, H.L. Cheng, K.C. Fan and C.L. Lin, "Personal authentication using palmprint features," *Pattern Recognition*, vol. 36, No. 2, pp. 371-381, 2003.

G.M. Lu, D. Zhang and K.Q. Wang, "Palmprint recognition using eignpalms features", To be appeared in *Pattern Recognition Letters*, vol. 24, pp. 1463-1467, 2003.

W. Li, D. Zhang and Z. Xu. "Palmprint identification by Fourier transform," *International Journal of Pattern Recognition and Artificial Intelligence*, vol. 16, No. 4, pp. 417-432, 2002.

D. Zhang, W.K. Kong, J. You and M. Wong, "On-line palmprint identification," *IEEE Transactions on Pattern Analysis and Machine Intelligence*, vol. 25, No. 9, pp. 1041-1050, 2003.

W. K. Kong and D. Zhang, "Feature-Level Fusion for Effective Palmprint Identification" submitted *International Conference on Biometric Authentication* 2004.

Derwent accession No. 2002-597252/64.

* cited by examiner

FIGURE 16  FIGURE 17

METHOD OF PALM PRINT IDENTIFICATION

This is a Continuation-in-part of application Ser. No. 10/253,914 filed on 25 Sep. 2002.

BACKGROUND TO THE INVENTION

1. Field of the Invention

The invention relates to biometrics identification, and in particular to a method for analyzing a palm print for the identification of an individual.

2. Background Information

Computer-aided recognition of individuals is becoming increasingly important in our information society. Biometrics is one of the most important and reliable methods in this field. The most widely used biometric feature is the fingerprint, whereas the most reliable feature is the iris. However, it is very difficult to extract small unique features (known as minutiae) from unclear fingerprints and iris scanners are very expensive. Other biometric features, such as the face and voice, are less accurate and they can be mimicked easily.

Palm print recognition for personal identification is becoming increasingly popular. Known methods include analyzing an image of a palm print to identify singular points, wrinkles, delta points and minutiae in the palm print. However, this requires a high-resolution image. Palmprint scanners that capture high-resolution images are costly and rely on high performance computers to fulfill the requirements of real-time identification.

One solution to the above problems seems to be the use of low-resolution images. In low-resolution palm print images, however, singular points and minutiae cannot be observed easily and only a small proportion of wrinkles are significantly clear. This makes it is questionable whether the use of such features from low resolutions provide sufficient distinctiveness to reliably identify individuals amongst a large population.

SUMMARY OF THE INVENTION

It is an object of the present invention to provide a method of biometrics identification, and in particular a method for analyzing a palm print for the identification of an individual, which overcomes or ameliorates the above problems.

According to the invention there is provided a method of biometrics identification including:

obtaining an image including a portion of a hand of an individual, analyzing the image to find two or more feature parameters defining different characteristics of the hand, said parameters including a geometrical features parameter, a palm line features parameter or a palm texture features parameter.

comparing the two or more feature parameters with reference information in a database.

Preferably, the geometrical features parameter comprises a relationship between two or more points on the image of the hand.

Preferably, the geometrical features parameter is a line intersecting two or more of a point between the first finger and middle finger, a point between the third finger and little finger, and a point defining the intersection of a palm line with a boundary of the hand.

Preferably, the geometrical features parameter is a line intersecting two or more of a point between the first finger and middle finger, a point between the third finger and little finger, and a point defining the intersection of a hear line or life line with a boundary of the hand.

Preferably, the geometrical features parameter includes two lines intersecting at least three points on the image of the hand, and an angle between the two lines.

Preferably, finding the palm line features parameter or palm texture features parameter includes extracting a repeatable sub-image from the image.

Preferably, finding the palm line features parameter includes finding the first-order and second-order derivatives of the sub-image in two or more directions to identify lines in the image, and calculating a value for total strength for the lines.

Preferably, finding the palm texture features parameter includes calculating a total texture energy for the image.

Preferably, finding the palm texture features parameter includes calculating a total texture energy for the image using an equation of the form $$TE(i, j, k) = \frac{\sum_{W_s}\sum_{W_y}(I*A_k)^2_{rs}}{P^2 W_x W_y}$$

where the rs sum is over all pixels within a square window W of size $W_x \times W_y$, centered on the pixel at i,j, $A_k$ is a zero sum "tuned" 5×5 convolution mask, and P is the normalizer $P^2=\Sigma_{i,j}(A_{i,j})^2$.

Further aspects of the invention will become apparent from the following description, which is given by way of example only.

BRIEF DESCRIPTION OF THE DRAWINGS

Embodiments of the invention will now be described with reference to the accompanying drawings in which.

DESCRIPTION OF THE PREFERRED EXAMPLE

In a preferred embodiment of the invention palmprint identification uses comparison of one or more feature parameters, which define a set of physical properties whose values describe different characteristics of the palm, with stored parameter information. In another embodiment identification relies on comparison of three feature parameters describing characteristics of the palm with stored parameter information.

The method of identification includes obtaining an image of the hand of an individual, analyzing the image and building two, or three, feature parameters describing different characteristics of the hand and palm print, and comparing these parameter to reference parameters stored in a database. The feature parameters are a geometrical feature vector (GFV) which describes geometric characteristics of the hand, a palm line feature (PLF) parameter which describes the characteristic lines on the palm, and a texture feature vector TFV) which the describes the texture characteristic of the palm. The following sections described how to obtain these feature parameters.

Geometrical Feature Extraction

Figure 1:
FIG. 1 shows the surface features of a palm print.
Figure 2:
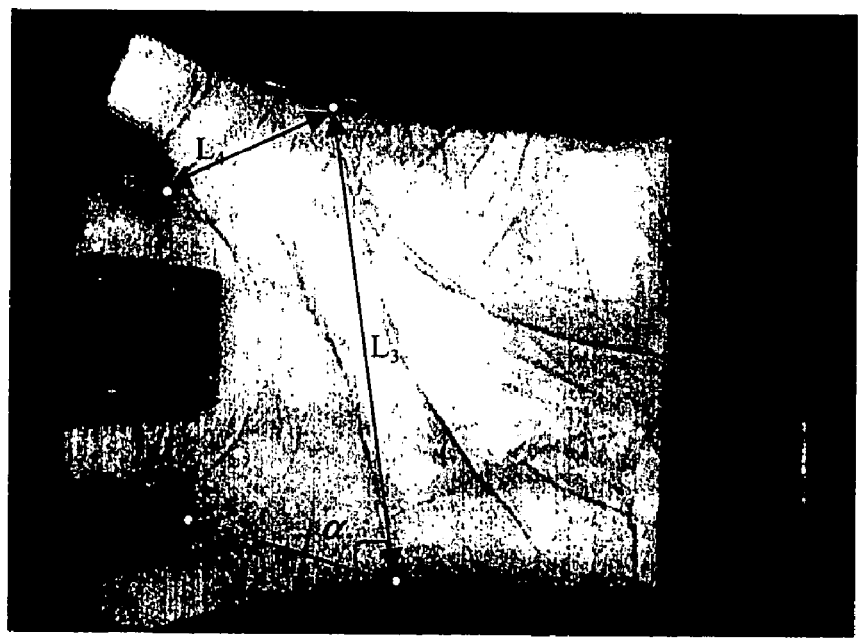
FIG. 2 shows the geometrical features of a palm print.

Referring to FIG. 2, the image of a hand has easily identifiable features comprising points $P_1$, $P_2$, $P_3$, $P_4$. P1 lies between the first finger and middle finger, $P_2$ between the third finger and little finger, $P_3$ is the intersecting point of the hear line with the palm boundary and $P_4$ is the intersecting point of the life line with the palm boundary. The relationship between the points $P_1$, $P_2$, $P_3$, $P_4$ can be defined by straight lines with $L_1$, $L_2$, $L_3$ and $L_4$ representing the distance between points $P_1$ and $P_2$, $P_2$ and $P_3$, $P_3$ and $P_4$, $P_4$ and $P_1$, respectively. Also, an angle α is the number of degrees between the lines $L_2$ and $L_3$ joining points $P_2$, $P_3$, and $P_4$.

The geometrical feature vector is GRV=($L_1$, $L_2$, $L_3$, $L_4$, α), and it is unique to an individual hand. The geometrical feature vector is used to identify an individual from their palm print. To obtain GFV, the points $P_1$, $P_2$, $P_3$ and $P_4$ must be found. Because these points exist on the boundary of the image and between prominent features such as the figures and major palm lines they can easily be found in low resolution images using known image processing techniques.

In the preferred embodiment of the invention points $P_1$, $P_2$ are also needed to define a repeatable sub-image for palm line feature extraction. Palm line feature extraction identifies the hear line and life line, and so points $P_1$, $P_2$, $P_3$ and $P_4$ can be found as part of the palm line feature extraction to obtain the GRV ($L_1$, $L_2$, $L_3$, $L_4$, α).

Palm Line Feature Extraction

A person does not always place their hand in the same position of the palm print scanning device and so it is desirable, but not essential, that the palm print sub-image is extracted and 'normalized' before PLF parameter is defined. This involves defining a repeatable sub-image of the palm area of the raw palm print image from a palm print scanner. This improves the accuracy of recognition. The points $P_1$ and $P_2$ defining the areas between the figures are obtained and used to find the sub-image.

Figure 3:
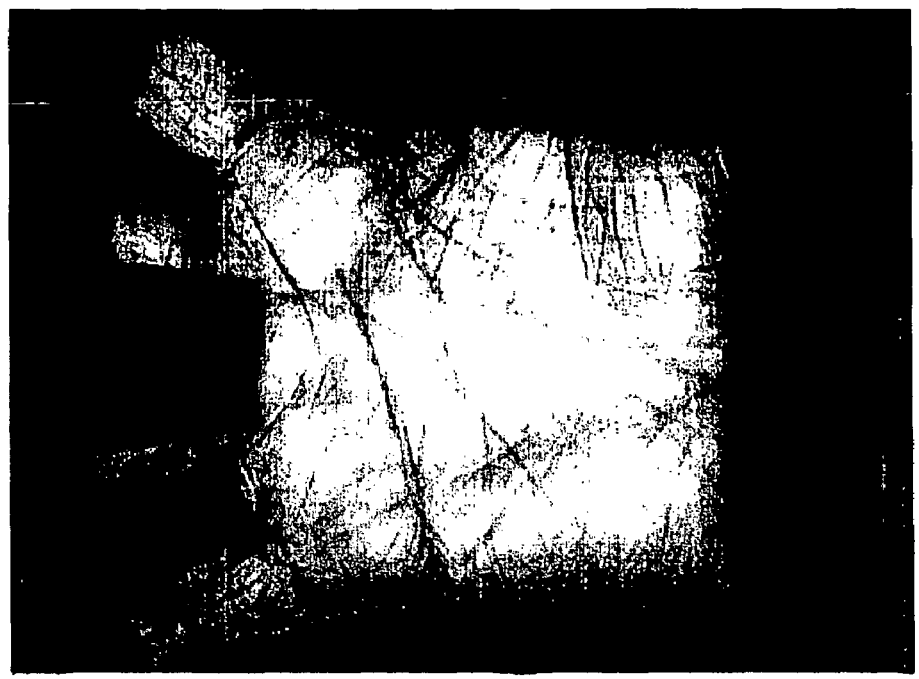
FIGS. 3 to 5 illustrate the steps to find two of the geometrical features of FIG. 2, FIGS. 6 to 9 illustrate the steps to obtain a normalized palm print image.

FIG. 3 shows a low-resolution image of a portion the inside surface of a hand that was obtained using a CCD camera. The sub-image of the palm area is identified by finding the points $P_1$ and $P_2$ between fingers building a coordinate system in which parameters that define the sub-image can be found. The preferred embodiment has six main steps, which are given below.

Figure 4:

Referring to FIG. 4, the first step is to apply a low pass filter, L(u,v), such as Gaussian, to the original image, O(x,y). Then, a threshold, $T_p$, is used to convert the convoluted image to a binary image, B(x,y).

Figure 5:
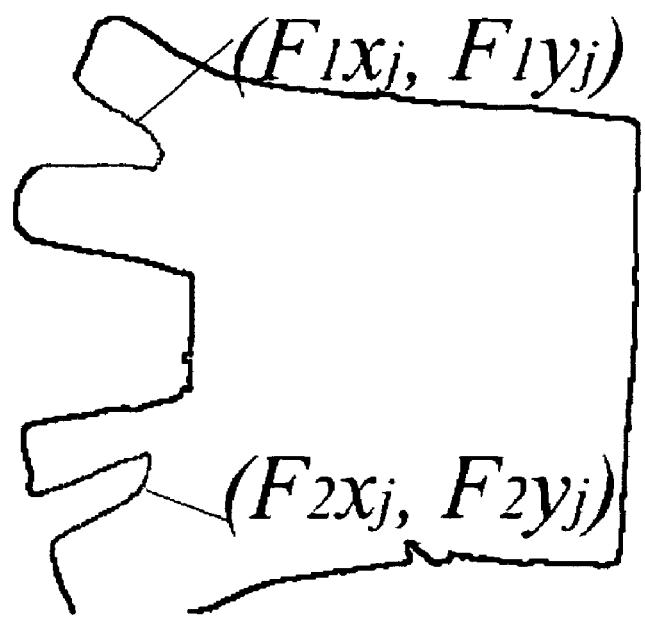

Referring to FIG. 5 the second step is to obtain the boundaries of the holes between the first finger and middle finger, and between the third finger and little finger using a boundary tracking algorithm. These are defined as ($F_ix_j$, $F_iy_j$): where i=1, 2. The boundary of the hole between ring and middle fingers is not extracted since it is not useful for the following processing. These holes define points $P_1$ and $P_2$. Boundary tracking algorithms are common and well known in the image process field.

Figure 6:
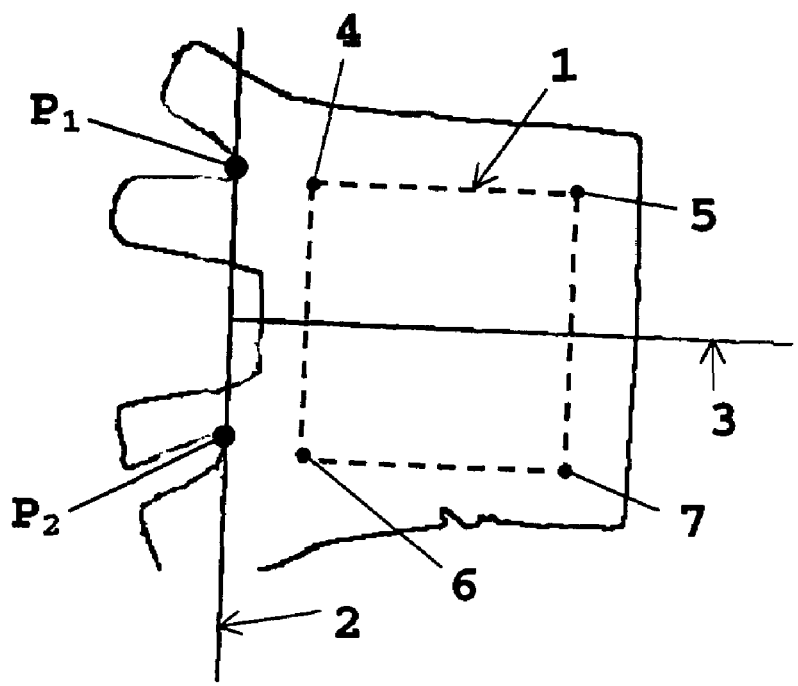

Referring to FIG. 6, the third step is to find a straight line 2 that passes through points $P_1$ and $P_2$. If $P_1$ and $P_2$ are two points on ($F_1x_j$, $F_1y_j$) and ($F_2x_j$, $F_2y_j$), respectively, where $P_1=(x_1, y_1)$ and $P_2=(x_2, y_2)$, then the line y=mx+c passing through $P_1$ and $P_2$ satisfies the inequality, $F_iy_j \leq mF_ix_j+C$, for all i and j. The line y=mx+c is the tangent of the two holes between the Fingers. This line, represented by numeral 2 in FIG. 6, is the Y-axis of a coordinate system used for determining the location of a sub-image 1.

The fourth step is to find the X-axis of the coordinate system. The X-axis is a line 3 passing through the midpoint of $P_1$ and $P_2$ $_{and}$ perpendicular to line 2.

The fifth step is to extract the sub-image 1 with a dynamic size on the basis of the coordinate system. The size and location of the sub-image 1 are based on the Euclidean distance (D) between points $P_1$ and $P_2$. The points 4, 5, 6, 7 representing the corners of the sub-image 1 in the coordinate system are (0.25 D, 0.5 D), (1.25 D, 0.5 D), (0.25 D, −0.5 D) and (1.25 D, −0.5 D) respectively. Thus the sub-image 1 is square with a distance along each side equal to the Euclidean distance and symmetrical about the Y-axis line 3. Because the sub-image is based on feature of the hand (i.e. the area between the fingers) it is repeatable for each individual hand.

Figure 7:
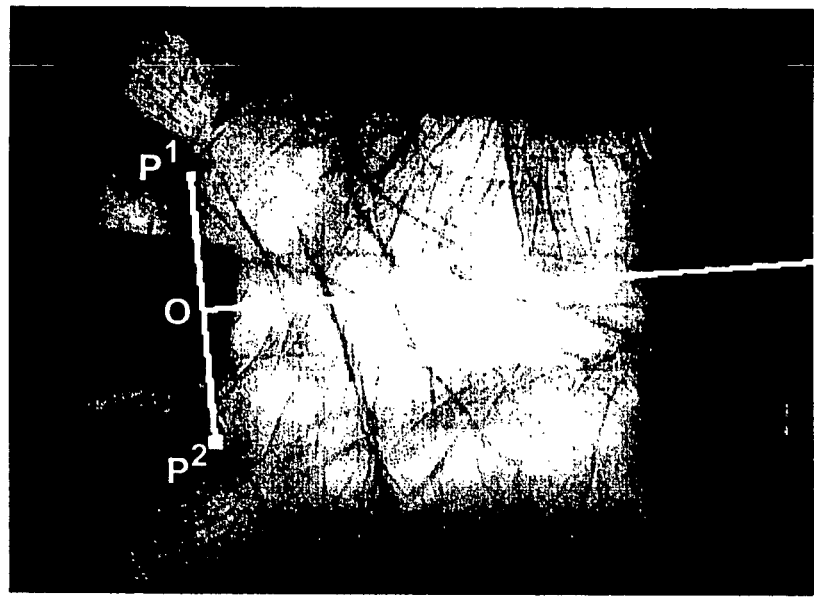
Figure 8:
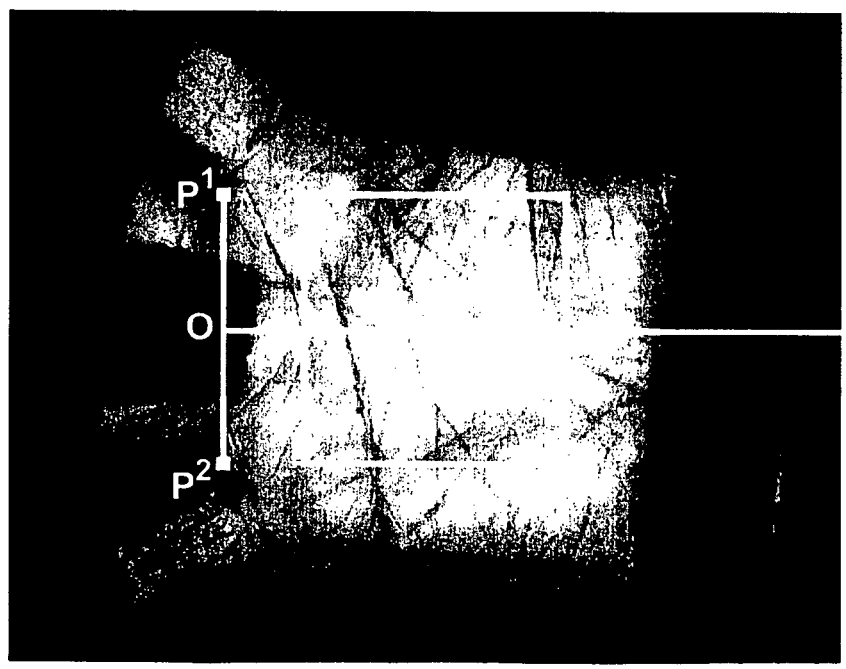
Figure 9:
Figure 10:
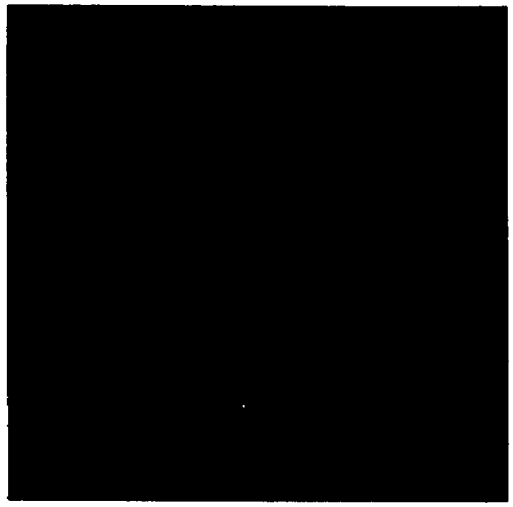
FIGS. 10 to 13 illustrate identified surface features of the palm print image in FIG. 9, FIGS. 14 to 17 illustrate 'tuned masks' for palm print texture extraction for horizontal, vertical, 45° and −45° lines.
Figure 11:
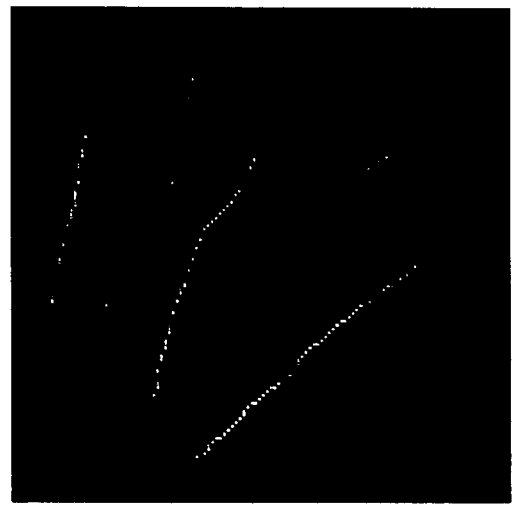
Figure 12:
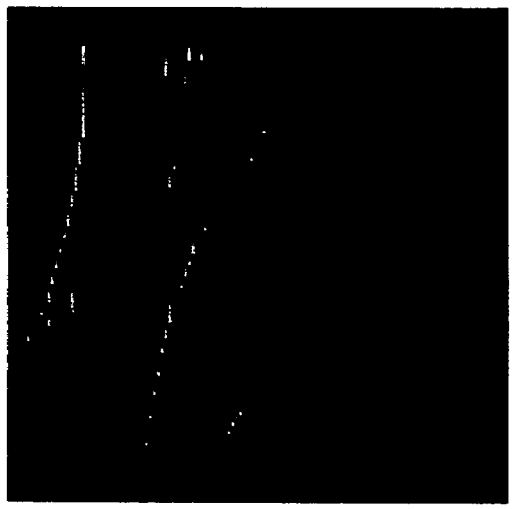
Figure 13:

FIGS. 7 and 8 shows the x and y axes 2, 3 of the coordinate system and the sub-image 1 overlaid on the raw image of FIG. 3. The sixth step is to normalize the sub-image 1 to a standard size using bilinear interpolation for feature extraction. FIG. 9 shows a normalized sub-image 1.

To find Point $P_3$ and $P_4$ the palm-lines are extracted first by using the following method. And then, according to the length, position and strength of palm-lines, the heart line and life line can be obtained. Lastly, the Point $P_3$ and $P_4$ are obtained by finding the intersecting points of the heart line and life line with the boundary of the palm.

Palm-lines are a kind of roof edge. A roof edge can be defined as a discontinuity in the first-order derivative of a gray-level profile. In other words, the positions of roof edge points are the zero-crossing points of their first-order derivatives. The magnitude of the second-derivative indicates the strength of the roof edge. These properties can used to detect palm-lines. Because the directions of palm-lines are arbitrary, detection must be done in different directions. The lines that can be detected in θ direction are called Directional Lines in θ direction. The directional of horizontal lines is in the θ=0° direction.

Suppose that I(x,y) denotes an image. In order to improve the connection and smoothness of the lines, the image is smoothed along the line direction (say, the horizontal direction) by a 1-D Gaussian function $G_{\sigma_s}$ with variance $$\sigma_s : I_s = I * G_{\sigma_s} \quad \text{(Equation 1),}$$

where * is the convolve operation.

The first-order derivative I' and second-order derivative I" in the vertical direction are obtained by convolving the smoothed image $I_s$ with the first-order derivative ($G'_{\sigma_d}$) and second-order derivative ($G''_{\sigma_d}$) of a 1-D Gaussian function $G_{\sigma_d}$ with variance $\sigma_d$. The equations are:

$$I' = I_s * (G'_{\sigma_d})^T = (I * G_{\sigma_s}) * (G'_{\sigma_d})^T = I * (G_{\sigma_s} * (G'_{\sigma_d})^T) \quad \text{(Equation 2) and}$$

$$I'' = I_s * (G''_{\sigma_d})^T = (I * G_{\sigma_s}) * (G''_{\sigma_d})^T = I * (G_{\sigma_s} * (G''_{\sigma_d})^T) \quad \text{(Equation 3),}$$

where T is the transpose operation and * is the convolve operation.

If the directional line detectors $H_1^\theta$, $H_2^\theta$ are:

$$H_1^0 = G_{\sigma_s} * (G'_{\sigma_d})^T \quad \text{(Equation 4) and}$$

$$H_2^0 = G_{\sigma_s} * (G''_{\sigma_d})^T \quad \text{(Equation 5),}$$

Then $$I'=I*H_1^0 \quad \text{(Equation 6), and}$$

$$I''=I*H_2^0 \quad \text{(Equation 7)}$$

where $H_1^0$, $H_2^0$ are called the horizontal line detectors (directional line detectors in 0° direction).

The horizontal lines are obtained by looking for the zero-cross points of I' in the vertical direction and their strengths are the values of the corresponding points in I''. So $$L_0^1(x,y) = \begin{cases} I''(x,y), & \text{if } I'(x,y)=0 \text{ or } I'(x,y) \times I'(x+1,y) < 0; \\ 0 & \text{otherwise.} \end{cases} \quad \text{(Equation 8)}$$

Whether the roof edge is a valley or peak is given by the sign of the values in $L_0^1(x,y)$. Positive represent a valley and minus signs represent a peak. Since all palm-lines are valleys the minus values in $L_0^1(x,y)$ can be discarded. So $$L_0^2(x,y) = \begin{cases} L_0^1(x,y), & \text{if } L_0^1(x,y) > 0; \\ 0, & \text{otherwise.} \end{cases} \quad \text{(Equation 9)}$$

Compared to ridges, the palm-lines are much thicker. Therefore, a threshold, T, can be used to get rid of ridges from $L_0^2$. So $$L_0(x,y) = \begin{cases} L_0^2(x,y), & \text{if } L_0^2(x,y) \geq T; \\ 0, & \text{otherwise.} \end{cases} \quad \text{(Equation 10)}$$

$L_0$ is called the directional line magnitude image in 0° direction.

Because the directions of palm-lines are arbitrary, detection must be done in different directions. The directional line detectors $H_1^\theta$, $H_2^\theta$ in a direction $\theta$ can be obtained by rotating $H_1^0$, $H_2^0$ by angle $\theta$. And the line points can be obtained by looking for the zero-cross points in $\theta+90°$ direction. After discarding the peak roof edges and thresholding the directional line magnitude image $L_\theta$ in $\theta$ direction is obtained.

There are two parameters $\sigma_s$ and $\sigma_d$ in the directional line detectors $H_1^\theta$, $H_2^\theta$. $\sigma_s$ controls the connection and smoothness of the lines and $\sigma_d$ controls the width of the lines which can be detected. A small value of $\sigma_s$ results in the poor connection and poor smoothness of the detected lines while a large value $\sigma_s$ results in the loss of some short lines and the line segments whose curvature is large. The thin roof edges cannot be extracted when $\sigma_d$ is large. In general, palm-lines are long, straight and narrow, and so $\sigma_s$ should be large while $\sigma_d$ should be small for palm-line detection. For example $\sigma_s=1.8$ and $\sigma_d=0.5$.

FIGS. 10 to 13 illustrate directional line magnitude images of the palm in FIG. 9 for $\theta=0°, 45°, 90°$ and $135°$ respectively, with $\sigma_s$ and $\sigma_d$ are set to 1.8 and 0.5, respectively.

The following explains how to compute the directional line energy (DLE). Let $L_{\theta_j}(1 \leq j \leq K)$ be K directional line magnitude images of palm print image I. Each $L_{\theta_j}$ is divided equally into M×M blocks, labeled 1, ..., M×M. The directional line energy (DLE) of block i in $\theta_j$ direction is defined as:

$$E_{\theta_j}^i = \sum_{c=1}^{m} [L_{\theta_j}(x_c, y_c)]^2, \quad 1 \leq i \leq M \times M, \quad \text{(Equation 11)}$$

where m is the total number of points in the block and $(x_1, y_1)$, $(x_2, y_2)$, ..., $(x_m, y_m)$ are the coordinates of the points. DLE $E_{\theta_j}^i$ reflects the strength of the palm-lines in block i in direction $\theta_j$.

A K×M×M-dimensional vector V is constructed for the whole palm print. The equations for vector V is:

$$V=(E_{\theta_1}^1, E_{\theta_1}^2, \ldots, E_{\theta_1}^{M \times M}, \ldots, E_{\theta_k}^1, E_{\theta_k}^2, \ldots, E_{\theta_k}^{M \times M}) \quad \text{(Equation 12)}$$

The vector V is normalized by using the maximum and minimum values of its components. The equations for the normalized vector $\tilde{V}$ is:

$$\tilde{V}=(e_{\theta_1}^1, e_{\theta_1}^2, \ldots, e_{\theta_1}^{M \times M}, \ldots, e_{\theta_k}^1, e_{\theta_k}^2, \ldots, e_{\theta_k}^{M \times M}) \quad \text{(Equation 13)}$$

where $$e_{\theta_j}^i = \frac{E_{\theta_j}^i - E_{\min}}{E_{\max} - E_{\min}}, \quad 1 \leq i \leq M \times M, \quad 1 \leq j \leq K. \quad \text{(Equation 14)}$$

and $E_{max}$ and $E_{min}$ are the maximum and minimum values of the components of V respectively. The normalized vector $\tilde{V}$ is called a Palm-line feature (PLF) with K directions.

As described above, to construct a PLF, the palm print image is divided into M×M blocks definitely. Each point on a directional line has only two states: either it belongs to a block or not. Because it is impossible to remove all of the translations and rotations during the preprocessing stage, the points around the boundaries of blocks in an image may not be in the same block of the image captured from the same palm at different time. To avoid this problem, a method of fuzzy block and fuzzy division are used.

Let 2 l be a positive integer, and U be the collection of all points in the palm print. Then, a fuzzy block, $FB_k$, whose central point is $(x_k, y_k)$, can be defined as follows.

$$FB_k = \{\mu_k(i,j)/(i,j)\} \quad \text{(Equation 15)}$$

where $(i,j)$ is the coordinates of the point and $\mu_k(i,j)$ is the corresponding membership function in the $FB_k$. $\mu_k(i,j)$ is given by:

$$\mu_k(i,j) = \begin{cases} 1, & d \leq l/2; \\ \frac{2(l-d)}{l}, & l/2 < d < l; \\ 0, & d \geq l. \end{cases} \quad \text{(Equation 16)}$$

where $d=\max(|i-x_k|, |j-y_k|)$ \quad (Equation 17)

According to Equations 16 and 17, the membership grade of a point in a fuzzy block is computed by examining the distance from it to the central point of the block.

We call M×M fuzzy blocks, which are labeled $(0,0), (0,1), \ldots, (i,j), \ldots, (M-1, M-1)$, a M×M fuzzy division of an image with size N×N if and only if $$x_i = l + \frac{3}{2} \times i \times l, \quad \text{(Equation 18)}$$

$$y_j = l + \frac{3}{2} \times j \times l, \text{ and} \quad \text{(Equation 19)}$$

$$x_{M-1} = y_{M-1} = l + \frac{3}{2} \times (M-1) \times l = N - l, \quad \text{(Equation 20)}$$

where $(x_i, y_j)$ is the center point of block $(i,j)$ $(i,j=0,\ldots,M-1)$; M and 2 l are two positive integers.

In fuzzy division of an image, each fuzzy block overlaps $$\frac{l}{2} \times 2l = l^2$$

pixels of the adjacent blocks, thus there is no definite boundary between the fuzzy blocks, so Equation 20 can be rearranged as:

$$M = \frac{2N - l}{3l}. \quad \text{(Equation 21)}$$

Because both M and 2 l are positive integers. If for example N=128, then M only has four values: 85, 21, 5 and 1, which can satisfy Equation 21. The corresponding values of l are 1, 4, 16 and 64, respectively. That is, there exist four fuzzy divisions, i.e. a 85×85 fuzzy division, a 21×21 fuzzy division, a 5×5 fuzzy division and a 1×1 fuzzy division. The length of the corresponding PLFs is 85×85×K=7,225K, 21×21×K=441K, 5×5×K =25K and 1×1×K=K (where K is the number of the directional line magnitude images used to compute PLFs), respectively. Obviously, the 1×1 fuzzy division is not suitable for palm print recognition. Because the storage requirements and the computational complexity are direct ratio to the length of the vectors, the PLFs of the 85×85 and 21×21 fuzzy division are too long to use in palm print recognition. Therefore, the 5×5 fuzzy division is employed to compute PLF. For the fuzzy block, p, Equation 11 can be modified as follows:

$$\tilde{E}_{\theta_j}^j = \sum_{c=1}^{m} \{[L_{\theta_j}(x_c, y_c)]^2 \times \mu_p(x_c, y_c)\}, \; 1 \leq i \leq M \times M, \quad \text{(Equation 22)}$$

where m is the total number of points in this block and $(x_1,y_1)$, $(x_2,y_2), \ldots, (x_m,y_m)$ are the coordinates of these points. To obtain the definition of the PLF for the fuzzy division of the palm print $E_{\theta_j}^i$ is replaced with $E_{\theta_j}^i (1 \leq i \leq M \times M, 1 \leq j \leq K)$ in the Equations 12 to 14.

Texture Feature Vector Extraction

The texture energy (TE) of a palm print image I is defined as below:

$$TE(i, j, k) = \frac{\sum_{W_x} \sum_{W_y} (I * A_k)_{rs}^2}{P^2 W_x W_y}, \quad \text{(Equation 23)}$$

where the rs sum is over all pixels within a square window W of size $W_x \times W_y$ centered on the pixel at i, j, $A_k$ is a zero sum "tuned" 5×5 convolution mask as shown in FIGS. 14 to 17, and P is the parameter normalizer $P^2 = \Sigma_{i,j}(A_{i,j})^2$. TE is called a texture energy image.

FIGS. 14 to 17 illustrate four kinds of 'tuned masks' for global palm print texture extraction. FIG. 14 is the Horizontal line, FIG. 15 is the Vertical line, FIG. 16 is the 45° line and FIG. 17 is the −45° line.

The texture energy image TE is divided first into M×M blocks equally. Then the local texture energy for each block its is computed using:

$$LTE = \frac{1}{LN} \sum_{i=1}^{L} \sum_{j=1}^{N} \sum_{k=0}^{3} TE(x_i, y_j, k), \quad (24)$$

where L×M is the size of the block and $(x_i, y_j)$ are the coordinates of the points in the block.

Finally, a M×M vector is formed by using the local texture energies of all blocks, which is called texture feature vector (TFV).

Similarity Measurement

Similarity Measurement is used to compare the measured palm print parameters with reference parameters stored in an identification database.

For the GFV and PLF parameters Euclidean distance is used to measure the similarity. The Euclidean distance of two vectors, $v_1$ and $v_2$, are defined as follows:

$$D = \sqrt{\sum_{i=1}^{M} (v_1(i) - v_2(i))^2}, \quad \text{(Equation 25)}$$

where M is the length of the vectors, $v_1$ is the GFV or PLF extracted from the palm print, and $v_2$ is a vector parameter stored in an identification database.

For the TFV parameter the angular distance is used to evaluate the difference of two feature parameters. Let X and Y be two local texture energy feature vectors. The angular distance is as:

$$D_4 = \frac{X^T Y}{\|X\|\|Y\|}, \quad \text{(Equation 26)}$$

where T represents transpose of a vector and $\|\;\|$ is a norm of a vector.

The following experimental results illustrate the effectiveness of a system according to the invention. Palm print images were collected from 160 individuals, using a CCD-based palm print scanner. The palm print images were processed and vectors stored to establish a palm print database. The individuals were asked to provide 20 images of their right and left palms and so there were 3,200 palm prints in the database. The resolution of the images was 384×284 pixels, at 75 dpi. The sub-image 1 size is 128×128 pixels.

For testing the PLF features, six images of each palm were used as training samples to establish the database, and the remaining four were used as testing samples. The variances $\sigma_s$ and $\sigma_d$ of the directional line detectors $H_1^\theta$, $H_2^\theta$ were 1.8 and 0.5 respectively, and a Hysteresis threshold is used in which the high threshold is obtained by using Otsu' method to the non-zero points of $L_\theta^1$ and the low threshold is chosen as the minimum value of the non-zero points of $L_\theta^1$. A 5×5 fuzzy division of the images is used to compute PLFs. The templates are obtained by averaging PLFs of the training samples from the same palms. PLFs are computed by using six directional line magnitude images (the corresponding direction angles are 0°, 30°, 60°, 90°, 120° and 150°).

Figure 18:
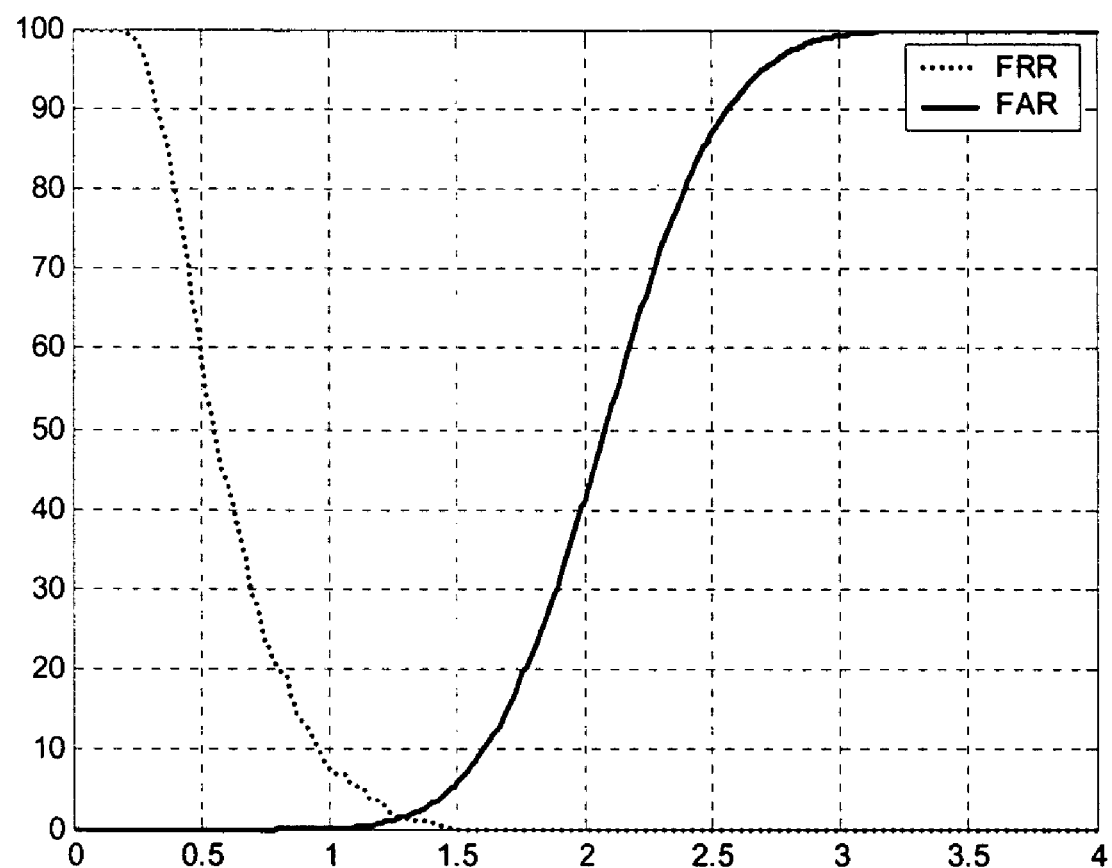
FIGS. 18 to 20 are graphs of verification test results for a method according to the invention.

An accuracy of 97.5% was obtained in one-against-320 matching tests. The false rejection rate (FRR) and the false acceptance rate (FAR) of one-against-one matching tests at different thresholds are plotted in FIG. 18. The equal error rate (EER, where FAR equal FRR) is 2.08%.

For testing the TFV parameter Palm print images were collected from 193 individuals using a CCD-based palm print scanner. The palm print images were processed and vectors stored to establish a palm print identification database. The individuals were asked to provide 10 images of their right and left palms and so there were 3,834 palm prints in the database.

Figure 19:
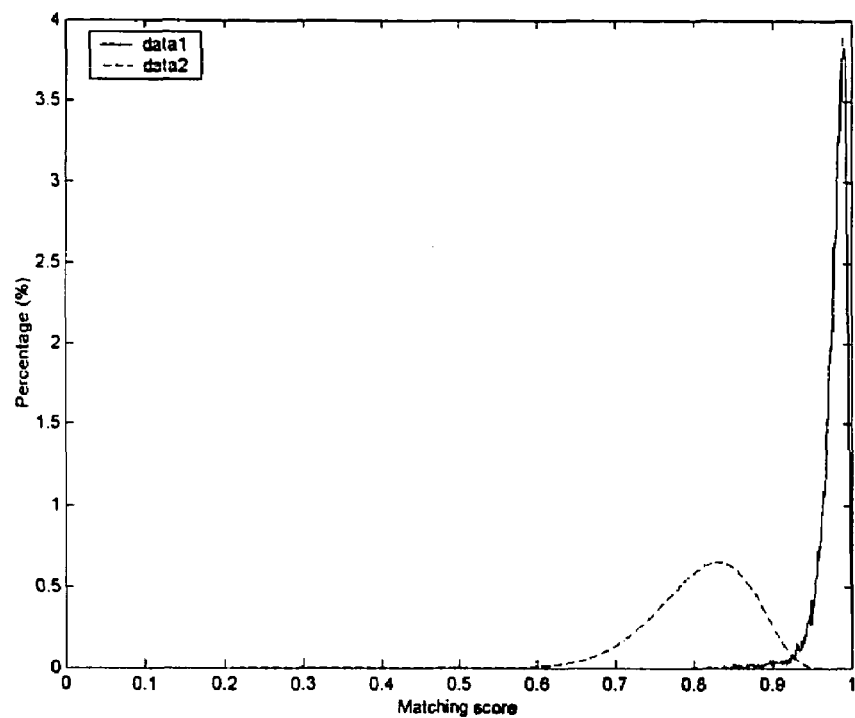
Figure 20:
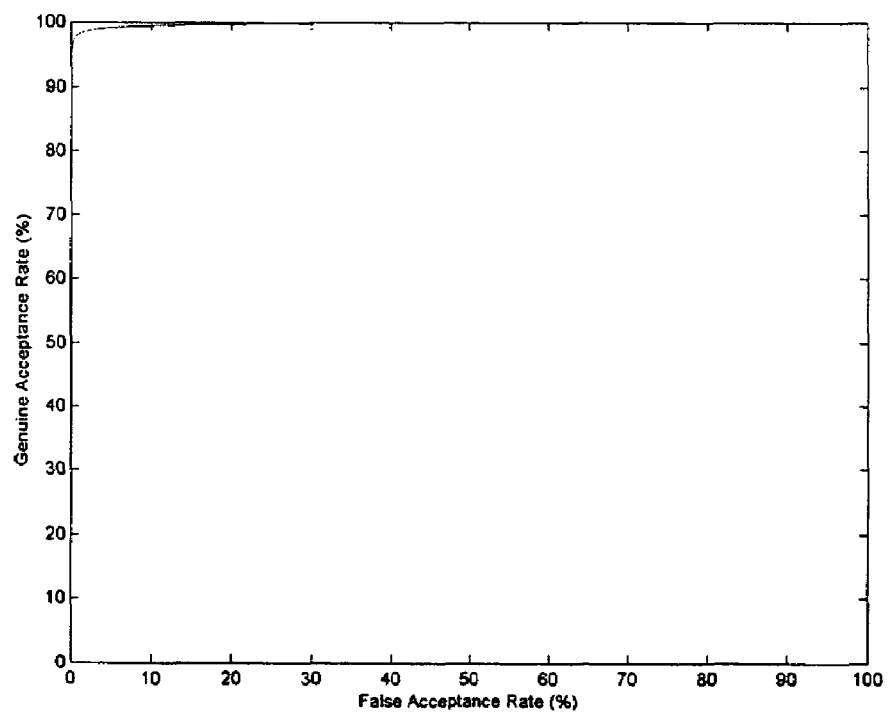

The verification accuracy is shown in FIG. 19. This presents the probability distributions of genuine and impostor of TFV. FIG. 20 is the receiver operating characteristic (ROC) of TFV. This is a plot of genuine acceptance rate against false acceptance rate for all possible operating points.

Where in the foregoing description reference has been made to integers or elements having known equivalents then such are included as if individually set forth herein.

Embodiments of the invention have been described, however it is understood that variations, improvements or modifications can take place without departure from the spirit of the invention or scope of the appended claims.

What is claimed is:

1. A method of biometrics identification including:
   obtaining an image including a portion of a hand of an individual, using a processor or computer to carry out the steps of:
   analyzing the image to find at least two feature parameters defining different characteristics of the hand, said feature parameters consisting of a geometrical features parameter, and at least one of a palm line features parameter or a palm texture features parameter, said geometrical features parameter comprising a relationship between two points located between the figures of the hand,
   comparing the two or more feature parameters with reference information in a database.

2. The method of claim 1 wherein the geometrical features parameter is a line intersecting two or more of a point between the first finger and middle finger, a point between the third finger and little finger, and a point defining the intersection of a palm line with a boundary of the hand.

3. The method of claim 1 wherein the geometrical features parameter is a line intersecting two or more of a point between the first finger and middle finger, a point between the third finger and little finger, and a point defining the intersection of a heart line or life line with a boundary of the hand.

4. The method of claim 1 wherein the geometrical features parameter includes two lines intersecting at least three points on the image of the hand, and an angle between the two lines.

5. The method of claim 1 wherein finding the palm line features parameter or palm texture features parameter includes extracting a repeatable sub-image from the image.

6. The method of claim 1 wherein finding the palm line features parameter includes finding the first-order and second-order derivatives of the sub-image in two or more directions to identify lines in the image, and calculating a value for total strength for the lines.

7. The method of claim 1 wherein finding the palm texture features parameter includes calculating a total texture energy for the image.

8. A method of biometrics identification including:
   obtaining an image including a portion of a hand of an individual, using a processor or computer to carry out the steps of:
   analyzing the image to find at least two feature parameters defining different characteristics of the hand, said at least one feature parameter consisting of a geometrical features parameter, and at least one of a palm line features parameter or a palm texture features parameter, said geometrical features parameter comprising a relationship between two points located between the figures of the hand,
   comparing the at least two feature parameters with reference information in a database,
   wherein finding the palm texture features parameter includes calculating a total texture energy for the image using an equation of the form $$TE(i,j,k) = \frac{\sum_{W_x}\sum_{W_y}(I*A_k)_{rs}^2}{P^2 W_x W_y}$$

where the rs sum is over all pixels within a square window W of size $W_x \times W_y$, centered on the pixel at i, j, $A_k$ is a zero sum "tuned" 5×5 convolution mask, and P is the normalizer.

* * * * *